United States Patent
Báder

(10) Patent No.: US 9,609,526 B2
(45) Date of Patent: Mar. 28, 2017

(54) PERFORMANCE-BASED CELL AGGREGATION IN A MOBILE NETWORK

(75) Inventor: Attila Báder, Paty (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/415,299

(22) PCT Filed: Jul. 18, 2012

(86) PCT No.: PCT/EP2012/064103
§ 371 (c)(1),
(2), (4) Date: Jan. 16, 2015

(87) PCT Pub. No.: WO2014/012588
PCT Pub. Date: Jan. 23, 2014

(65) Prior Publication Data
US 2015/0189515 A1   Jul. 2, 2015

(51) Int. Cl.
*H04W 40/00* (2009.01)
*H04W 16/24* (2009.01)
(Continued)

(52) U.S. Cl.
CPC ........... *H04W 16/24* (2013.01); *H04W 24/02* (2013.01); *H04W 28/08* (2013.01); *H04W 36/34* (2013.01);
(Continued)

(58) Field of Classification Search
CPC ..... H04W 28/08; H04W 84/12; H04W 16/18; H04W 16/28; H04W 28/021;
(Continued)

(56) References Cited

U.S. PATENT DOCUMENTS

| 2004/0229621 A1* | 11/2004 | Misra | H04W 16/08 455/445 |
| 2007/0225023 A1* | 9/2007 | Abusch-Magder | H04B 17/345 455/515 |

(Continued)

FOREIGN PATENT DOCUMENTS

| EP | 2028870 A1 | 2/2009 |
| EP | 2056609 A1 | 5/2009 |
| EP | 2403288 A2 | 1/2012 |

*Primary Examiner* — Nimesh Patel
(74) *Attorney, Agent, or Firm* — Murphy, Bilak & Homiller, PLLC

(57) ABSTRACT

For controlling aggregation of cells (101, 111, 112, 113, 114, 115, 116, 201, 211, 212, 213, 214, 215, 216) of a mobile network, a network management device (300) determines a traffic load of a cell (101, 111, 112, 113, 114, 115, 116, 201, 211, 212, 213 214, 215, 216) of the mobile network. Further, the network management device (300) determines a rate of handovers between the cell (101, 111, 112, 113, 114, 115, 116, 201, 211, 212, 213, 214, 215, 216) and at least one further cell (101, 111, 112, 113, 114, 115, 116, 201, 211, 212, 213, 214, 215, 216) of the mobile network. On the basis of the traffic load and the rate of handovers, the network management device (300) controls aggregation of the cell (101, 111, 112, 113.114, 115, 116, 201, 211, 212, 213, 214, 215, 216) and the at least one further cell (101, 111, 112, 113, 114, 115, 116, 201, 211, 212, 213, 214, 215, 216) to an aggregated cell.

17 Claims, 7 Drawing Sheets

(51) Int. Cl.
*H04W 24/02* (2009.01)
*H04W 28/08* (2009.01)
*H04W 36/34* (2009.01)
*H04W 36/00* (2009.01)
*H04W 84/04* (2009.01)
*H04W 88/08* (2009.01)
*H04W 88/12* (2009.01)

(52) U.S. Cl.
CPC ...... *H04W 36/0083* (2013.01); *H04W 84/047* (2013.01); *H04W 88/08* (2013.01); *H04W 88/12* (2013.01)

(58) Field of Classification Search
CPC ..... H04W 40/22; H04W 64/00; H04W 40/06; H04W 24/02; H04W 36/22; H04W 28/0226; H04W 28/0284; H04W 16/14; H04W 28/02; H04W 40/20; H04W 72/042; H04W 24/08; H04W 84/045; H04W 28/0289; H04W 84/005; H04W 52/343; H04W 52/40; H04W 84/18; H04W 72/04; H04W 72/0486; H04W 52/0216; H04L 41/0816; H04L 41/06; H04L 65/4084; H04L 67/1029; H04L 67/2814; H04L 45/245; H04L 12/1485; H04L 43/0811; H04L 45/28; H04L 47/10; H04L 47/14; H04L 47/24; H04L 5/001; H04L 5/0023; H04L 5/0055; H04L 1/0026; H04L 1/1854; H04L 1/1893; H04L 41/5025; H04L 41/5035; H04L 43/04; H04L 5/0044; H04L 5/0057; H04L 5/0064; H04L 5/0073
See application file for complete search history.

(56) References Cited

U.S. PATENT DOCUMENTS

| | | | |
|---|---|---|---|
| 2008/0137594 A1* | 6/2008 | Roh | H04L 1/1812 370/328 |
| 2009/0103492 A1* | 4/2009 | Altshuller | H04W 16/26 370/331 |
| 2009/0270106 A1* | 10/2009 | Matsunaga | H04W 28/08 455/445 |
| 2010/0085884 A1* | 4/2010 | Srinivasan | H04W 16/08 370/252 |
| 2010/0087142 A1* | 4/2010 | Panpaliya | H04W 16/26 455/15 |
| 2010/0151908 A1 | 6/2010 | Skarby et al. | |
| 2011/0319052 A1* | 12/2011 | Corem | H04L 63/30 455/405 |
| 2012/0252464 A1* | 10/2012 | Borst | H04W 36/22 455/443 |

* cited by examiner

PERFORMANCE-BASED CELL AGGREGATION IN A MOBILE NETWORK

TECHNICAL FIELD

The present invention relates to methods for aggregating cells in a mobile network and to corresponding devices.

BACKGROUND

In mobile networks, it is known to use radio access technologies such as GSM (Global System for Mobile Communications), WCDMA (Wideband Code Division Multiple Access) or 3GPP LTE ($3^{rd}$ Generation Partnership Project Long Term Evolution). In these radio access technologies, the mobile network is organized in cells, each cell being served by a base station or a sector of a base station. The different radio access technologies typically operate in different carrier frequency bands, and frequency distributions among operators and/or among the different radio access technologies are typically controlled by the local authorities. A certain radio access technology may also utilize multiple carrier frequency bands at the same time to increase network capacity. Such mobile networks may also be referred to as multi-carrier mobile networks. If only a single frequency band is used, the mobile network may be referred to as a single-carrier mobile network.

The cellular structure of the above-mentioned mobile networks allows for supporting mobility of a user equipment (UE). The UE can connect to the mobile network in a certain cell and move to other cells of the mobile network without interruption of service. Mobility is achieved by performing handovers of the UE between the cells. At a given location, there may be an overlap of cells belonging to the same or to different mobile networks. A handover may then be performed between such overlapping cells for which a neighbor relation is configured. The handover decision is typically based on radio measurements and certain policies. Depending on the particular situation, different types of handover can be distinguished: intra-frequency handovers, inter-frequency handovers, and inter radio access technology (IRAT) handovers. Intra-frequency handover take place between cells using the same frequency band. Inter-frequency handovers take place between cells using different frequency bands of the same radio access technology, e.g., as supported in WCDMA or LTE. IRAT-handovers take place between cells using different types of radio access technology, e.g., from a GSM cell to a WCDMA cell or to an LTE cell.

The cell structure of a mobile network may be determined by planning tools, e.g., based on mostly geographical information and expected radio propagation characteristics. The goal of cell planning typically is to provide a full geographical coverage and appropriate cell relations in the service area. In many case, the initially planned cell structure is determined separately for each type of radio access technology, and inter-radio access technology relations are added later in order to make handover between the different radio access technologies possible. When geographical coverage or capacity of the mobile network is not enough to support increasing traffic, cells may be added to the mobile network. In a multi-carrier mobile network, cells may be first added in the a first frequency band. If no further increase of the network capacity is possible within the first frequency band, cells may be added in a further frequency band. The resulting cell structure in a mobile network using multiple radio access technologies and/or multiple frequency bands can be quite complex.

The neighbor relations between cells are usually determined by geometrical considerations during planning of the cell structure. When new cells are activated, the neighbor relations can be optimized on the basis of radio measurements performed by UEs and handover related statistical data. For example, the UEs can be requested to measure and report the signal strength of the new cells. If a sufficiently strong signal is measured in a given serving cell, a neighbor relation between the serving cell and the new cell is established. Further, in the case of a failure rate of handovers between two cells or in the case of a low rate of handovers between two cells, the existing neighbor relation between the two cells can be removed.

A mobile network may utilize omni-cell and 2-6 sector cell structures: Large areas with a typically small number of UEs to be served may be covered by a large omni-cell. If there is a high density of UEs to be served, smaller and more densely arranged sector cells may be used to provide a higher capacity. According to some concepts, a base station may provide multiple sector cells which may be aggregated to an omni-base station configuration, thereby allowing for energy saving during low traffic periods. The capacity of a cell can be regarded as more or less constant. Accordingly, a higher cell density in a certain area allows for serving more UEs at the same time.

Accordingly, in a process of expanding a mobile network, cells are typically added to the existing cell structure, e.g., in areas with insufficient geographical coverage or insufficient capacity, i.e., if the traffic load approaches the capacity of the existing cells. If an expansion in the existing frequency band is no longer possible, a new frequency bands may need to be used. This in turn requires investments, e.g., for licensing the new frequency band or new radio equipment. On the other hand, fully exploiting the new frequency band is typically not possible because the traffic increase in the traffic load is gradual. Accordingly, network expansion may leave capacity unexploited for relatively long time.

Accordingly, there is a need for techniques which allow for efficiently managing the cell structure of a mobile network.

SUMMARY

According to an embodiment of the invention, a method for controlling aggregation of cells of a mobile network is provided. According to the method, a network management device determines a traffic load of a cell of the mobile network. Further, the network management device determines a rate of handovers between the cell and at least one further cell of the mobile network. On the basis of the traffic load and the rate of handovers, the network management device controls aggregation of the cell and the at least one further cell to an aggregated cell.

According to a further embodiment of the invention, a network management device is provided. The network management device is configured for controlling aggregation of cells of a mobile network. The network management device comprises a performance monitor and a cell aggregation controller. The performance monitor is configured to determine a traffic load of a cell of the mobile network and to determine a rate of handovers between the cell and at least one further cell of the mobile network. The cell aggregation controller is configured to control, on the basis of the traffic load and the rate of handovers, aggregation of the cell and the at least one further cell to an aggregated cell.

According to a further embodiment, a computer program product is provided. The computer program product comprises program code to be executed by a processor of a network management device, thereby configuring the network management device to operate in accordance with the above method, i.e., to determine a traffic load of a cell of the mobile network, to determine a rate of handovers between the cell and at least one further cell of the mobile network, and to control, on the basis of the traffic load and the rate of handovers, aggregation of the cell and the at least one further cell to an aggregated cell.

DETAILED DESCRIPTION OF EMBODIMENTS

In the following, the invention will be explained in more detail by referring to exemplary embodiments and to the accompanying drawings. The illustrated embodiments relate to methods and devices for managing a cell structure of a mobile network, in particular for controlling cell aggregation. Cell aggregation refers to a process of combining the areas of two or more cells of the mobile system to a single aggregated cell. From a network management perspective, the aggregated cell may then appear and be handled as a single cell. The aggregated cells may belong to the same base station or to different base stations. If the aggregated cells belong to the same base station, antennas of the cells may be served by the same radio unit, using the same frequency or code, depending on the implemented radio access technology. If the cells belong to different base stations, one or more of the base stations may operate as a radio repeater. Other types of cell aggregation techniques may be used as well. In the illustrated examples, the mobile network may be a multi-carrier mobile network, e.g., using 3GPP LTE or UMTS (Universal Mobile Telecommunications System), based on WCDMA, as radio access technology. However, the concepts may also be applied to a single carrier mobile network, e.g., using GSM as radio access technology.

Figure 1:
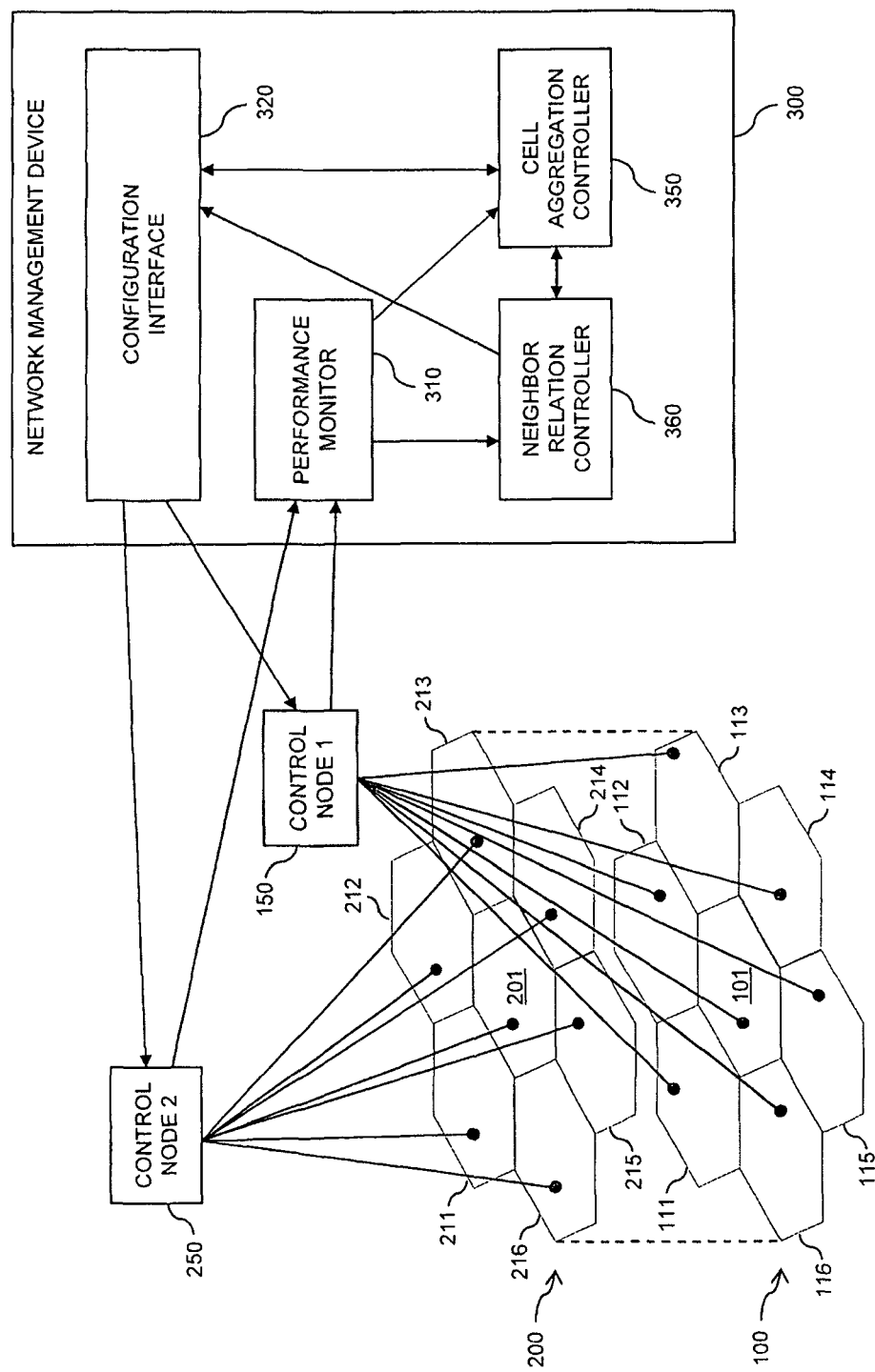
FIG. 1 schematically illustrates a multi-cell mobile network in which concepts according to an embodiment of the invention are implemented.

FIG. 1 schematically illustrates exemplary structures of the mobile network, which supports performance-based cell aggregation. More specifically, FIG. 1 illustrates cells 101, 111, 112, 113, 114, 115, 116, 201, 211, 212, 213, 214, 215, 216 of the mobile network, and a network management device 300 coupled to the cells. Depending on the implementation of the mobile network, also one or more control nodes may be provided. In the example of FIG. 1, a first control node 150 and a second control node 250 are coupled between the network management device 300 and the cells 101, 111, 112, 113, 114, 115, 116, 201, 211, 212, 213, 214, 215, 216. For example, when assuming a UMTS/WCDMA radio access technology, the first and second control nodes 150, 250 may correspond to Radio Network Controllers (RNCs). In other implementations, such separate control nodes may not be present. For example, when using 3GPP LTE radio access technology, the network management device 300 may be coupled directly to base stations of the cells 101, 111, 112, 113, 114, 115, 116, 201, 211, 212, 213, 214, 215, 216.

In the illustrated example, the cells 101, 111, 112, 113, 114, 115, 116 belong to a first frequency band 100, and the cells 201, 211, 212, 213, 214, 215, 216 belong to a second frequency band 200. The first control node 150 controls the cells 101, 111, 112, 113, 114, 115, 116 of the first frequency band 100, and the second control node 250 controls the cells 201, 211, 212, 213, 214, 215, 216 of the second frequency band 200. In the illustrated example, the cells 111, 112, 113, 114, 115, and 116 are neighboring cells of the cell 101, and the cells 211, 212, 213, 214, 215, and 216 are neighboring cells of the cell 201.

The network management device 300 is provided with a performance monitor 310, a configuration interface 320, and a cell aggregation controller 350. Further, the network management device 300 may be equipped with a neighbor relation controller 360. The network management device 300 may be implemented as a single device or by multiple individual devices configured to implement certain functionalities of the network management device 300. The network management device 300 may also be referred to as a network management system.

In accordance with concepts as illustrated herein, the performance monitor 320 is configured to collect performance data of the cells 101, 111, 112, 113, 114, 115, 116, 201, 211, 212, 213, 214, 215, 216. In particular, such performance data may include a traffic load of the cell and a handover rate of the cell. The performance data may also include Key Performance Indicators (KPIs). The performance data are provided to the cell aggregation controller 350. Further, the performance data may be provided to the neighbor relation controller 360. The cell aggregation controller 350 is configured to control aggregation of two or more of the cells 101, 111, 112, 113, 114, 115, 116, 201, 211, 212, 213, 214, 215, 216 to an aggregated cell. In particular, the cell aggregation controller 350 may decide whether a given cell, e.g., cell 101, should be aggregated with one or more further cells, e.g., one or more of the cells 111, 112, 113, 114, 115, 116. Further, the cell aggregation controller 350 may also decide whether such aggregation should be released. These decisions of the cell aggregation controller 350 are based on the performance data obtained by the performance monitor 310, in particular on the traffic load of the cell and the rate of handovers between the cell and the further cell. In addition, the cell aggregation controller 350 may also base such decisions on network topology data, e.g., provided by the configuration interface 320, and/or on neighbor relation data of the cell, e.g., provided by the neighbor relation controller 360.

By controlling the aggregation of cells on the basis of the performance data, the effective number of cells and the required capacity in the mobile network can be balanced in an efficient manner. By forming one or more aggregated cells, the effective number of cells can be reduced, and a less complex cell structure be obtained, e.g., allowing for a reduction of handovers. However, because the aggregation decision is based on the performance data, adverse effects such as overloaded aggregated cells can be avoided.

The neighbor relation controller 360 may be configured to utilize the performance data for optimizing neighbor relations of the cells and aggregated cells, e.g., in terms of a neighbor relation matrix. Typically, such optimization may aim at reducing the number of neighbor relations configured for a cell or aggregated cell. The neighbor relation controller 360 may also be configured to optimize parameters for controlling handovers between the cells 101, 111, 112, 113, 114, 115, 116, 201, 211, 212, 213, 214, 215, 216 or aggregated cells. These parameters may for example define radio conditions in which a UE should be handed over to another cell or aggregated cell. The control of handovers may in turn be accomplished by the control nodes 150, 250 and/or by the base stations of the cells, e.g., on the basis of radio measurements performed by the UE. Handovers are assumed to be possible only between cells and/or aggregated cells that are configured as neighbors.

The configuration interface 320 allows for configuring the cell structure of the mobile network in accordance with the decisions of the cell aggregation controller 350 and/or of the neighbor relation controller 360. In the implementation of FIG. 1, this may be achieved by sending control signals to the control nodes 150, 250, which in turn may send control signals to the base stations of the cells 101, 111, 112, 113, 114, 115, 116, 201, 211, 212, 213, 214, 215, 216. In implementations without separate control nodes, the configuration interface may provide control signals directly to the base stations of the cells 101, 111, 112, 113, 114, 115, 116, 201, 211, 212, 213, 214, 215, 216.

The cell aggregation controller 320 may operate by first using the traffic load of the cells 101, 111, 112, 113, 114, 115, 116, 201, 211, 212, 213, 214, 215, 216 for identifying a cell as a candidate for aggregation. This may be accomplished by comparing the traffic load of the cell to a threshold, e.g., defined at 30% to 60% of the capacity of the cell. If the traffic load of the cell is below the threshold, the cell may be selected as a candidate for aggregation. Next, one ore more further cells to be aggregated with the cell may be selected. This may be accomplished on the basis of the rate of handovers between the cell and the further cell. Further, the traffic load of the further cell may be taken into account. As a result pairs or larger groups of cells to be aggregated can be determined. In some scenarios, if two pairs of cells to be aggregated are identified and one cell is common for both pairs, the possibility to aggregate the three different cells may be checked as a next step, thereby joining pairs of cells to larger groups. In some scenarios, a maximum limit may be defined for the number of cells to be aggregated to an aggregated cell.

Having determined a pair or group of cells to be aggregated, the cell aggregation controller 350 may proceed by determining a dominant cell from this pair or group. The dominant cell may be regarded as the most significant cell among the aggregated cells. The dominant cell may be characterized by a central geographical location within the aggregated cells, carry most traffic among the aggregated cells, and/or be involved in the highest number of handovers among the aggregated cells.

The determination of the dominant cell may be accomplished on the basis of the traffic load of the cells, the rate of handovers between the cells, and/or geographical data, e.g., distances between base stations of the cells. The dominant cell may be used as a parent cell of the aggregated cell. In particular, the base station of the dominant cell may be configured as a donor base station, and the base stations of the other cell(s) may be configured as a repeater with a backhaul connection to the donor base station. If the cells belong to the same base station, it is also possible to combine the antenna signals of the different cells. The aggregated cell may be handled in the same way as an individual cell served by the base station of the dominant cell, e.g., when performing handovers or certain management procedures such as optimization of neighbor relations.

For the aggregated cell, the neighbor relations may be defined by using the neighbor relations of all aggregated cells, except the neighbor relations of the dominant cell. This may be accomplished by forming the neighbor relation matrix of the aggregated cell to include the neighbor relations of the aggregated cells that are not part of the neighbor relation matrix of the dominant cell.

The aggregated cells and the new neighbor relations may then be indicated to the configuration interface, so that the cell structure of the mobile network can be reconfigured accordingly. Before actual application of the new configuration, it may be subjected to a check, optional modification, and approval by the operator of the mobile network.

The neighbor relations in the cell structure including the one or more aggregated cells may be subjected to further optimization by the neighbor relation controller 360. This may again be accomplished on the basis of the performance data, e.g., one the basis of measurements performed by UEs in the reconfigured cell structure. For example, the measurements may include measurements of one or more KPI, e.g., handover KPIs and/or other KPIs. Such KPIs may be compared to corresponding KPIs before the reconfiguration. If a degradation of one or more KPI is detected for a certain aggregated cell, the aggregation of this cell may be released by returning to the original cell structure of the aggregated cell, i.e., to the individual cells before aggregation.

Further, as the traffic load increases an aggregated cell may reach its capacity limit, which is essentially defined by the capacity of the dominant cell. Accordingly, after reconfiguring the cell structure, the performance monitor 310 may also monitor the traffic load of the aggregated cell(s). On the basis of the traffic load of the aggregated cell, the cell aggregation controller 350 may then decide whether the aggregation should be released by returning to the original cell structure of the aggregated cell, i.e., to the individual cells before aggregation. This can be done automatically by returning to the original configuration data of the aggregated cells, e.g., as stored by the aggregation controller 350.

The above concepts of controlling cell aggregation allow for efficiently managing the cell structure of the mobile network. In particular, the number of handovers, soft handovers, and handover failures can be reduced. Further, also the associated load on base stations and/or controllers can be reduced. In some scenarios, quantities related to such benefits, e.g., rate of handovers, soft handovers, handover failures, base station load, controller load, rate of call setup failures, rate of call drops may be detected and reported, thereby allowing for a more precise assessment of the effects of cell aggregation.

The performance-based control of cell aggregation may be utilized when expanding the mobile network by a new frequency band, e.g., when starting from a configuration with only the first frequency band 100 of FIG. 1 and then adding the second frequency band 200. In such a situation, unused capacity may be present for some time, which can be efficiently taken into account by aggregating cells.

In the following, exemplary processes in relation to the cell aggregation will be explained in more detail.

In these processes, the cell aggregation controller 350 may first obtain the traffic load of a plurality of cells, e.g., cells within a certain coverage area. In order to take into account changes of the traffic load during the course of a day, the traffic load may be considered in terms of a peak hour traffic load. In the following, the traffic load of the i-th cell is denoted by $I_i$. For a given cell, the cell aggregation controller 350 may then compare the traffic load to a load threshold value related to the total cell capacity, denoted by C. If the cell peak load satisfies $$I_i < p_1 \cdot C, \quad (1)$$

the cell may be selected as a candidate for aggregation. In relation (1), $p_1$ is a parameter that express a fraction of cell capacity at which the cell can be expected to tolerate adding the traffic of at least one neighboring cell. For example, a value of $p_1$ in the range of 30-60% may be used.

Then neighboring cells of the candidate cell are identified on the basis of the present neighbor relations of the candidate cell. These neighboring cells may then be ranked according to the rate $r_{ij}$ of handovers with respect to the candidate cell. For this purpose, the rates $r_{ij}$ may be compared between the different neighboring cells. The rate $r_{ij}$ may be expressed as the number of handovers during a result output period of the performance monitor 310, e.g., 15 minutes.

Next, the traffic load $I_h$ of the neighboring cell with the highest rate $r_{ij}$, is added to the traffic load $I_i$ of the candidate cell. If the aggregated traffic load minus a saved traffic load $g_{ih}$ due to saved handovers in the aggregated cell is lower than the load threshold value, i.e., relation $$I_i + I_h - g_{ih} < p_1 \cdot C \quad (2)$$

is satisfied, the cell aggregation controller 350 may decide to aggregate the candidate cell and the neighboring cell. The parameter $g_{ih}$ may be estimated as $$g_{ih} = f \cdot r_{ih}, \quad (3)$$

where f is a handover load factor expressing the system load due to a handover.

Then neighboring cell with the next lower rate $r_{ij}$ may be considered for incorporation to the aggregated cell, by adding the respective traffic load $I_{h-1}$ to the estimated traffic load of the aggregated cell and subtracting the corresponding saved traffic load $g_{ih-1}$ due to handovers and comparing the result to the load threshold. If the comparison shows that relation $$I_i + I_h + I_{h-1} - g_{ih} - g_{ih-1} < p_1 \cdot C \quad (4)$$

is satisfied, the cell aggregation controller 350 may decide to also incorporate this neighboring cell into the aggregated cell. This may be continued with the neighboring cell of respective next lower rate $r_{ij}$ as long as relation $$I_i + \sum_k I_{h-k} - \sum_k g_{ih-k} < p_1 \cdot C \quad (5)$$

is satisfied or until a maximum number of cells to be aggregated is reached.

As an output of the above process, the cell aggregation controller 350 may provide a list of pairs or groups of cells to be aggregated.

Having identified a pair or group of cells to be aggregated, the cell aggregation controller 350 may proceed by determining a dominant cell from this pair group, e.g., on the basis of a dominance parameter $D_i$. The dominance parameter $D_i$ may be calculated on the basis of the rates $r_{ij}$ of handovers between the i-th cell and the j-th cell of the group and distances $d_{ij}$ between a base station of the i-th cell and the base station of the j-th cell of the group. An exemplary scenario for illustrating the determination of the dominant cell is illustrated in FIG. 2.

Figure 2:
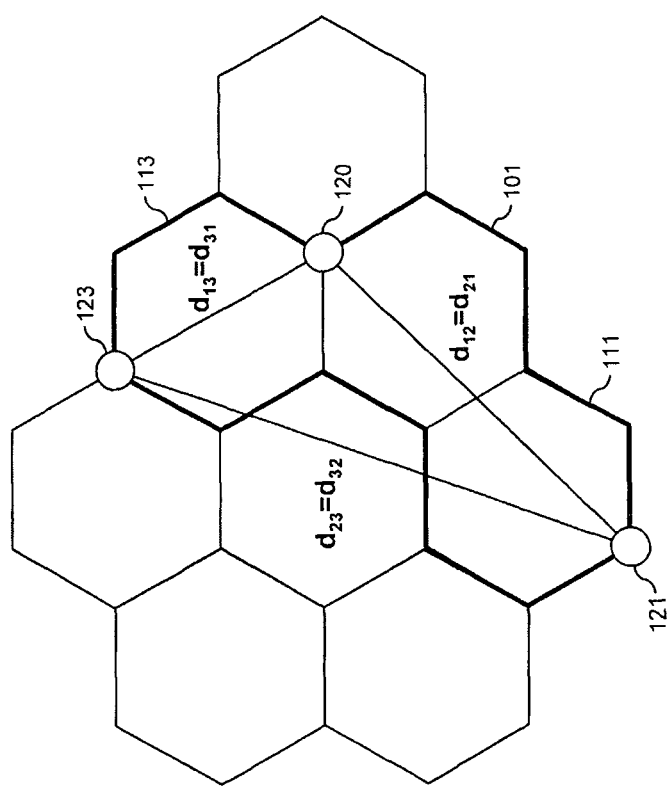
FIG. 2 schematically illustrates determination of a dominant cell of an aggregated cell according to an embodiment of the invention.

In the scenario of FIG. 2, it is assumed that the cell aggregation controller 350 decided to aggregate the cells 101, 111, and 113. The corresponding aggregated cell is enclosed by a solid line. Further, FIG. 2 also illustrates a base station 120 of the cell 101, a base station 121 of the cell 121, and a base station 123 of the cell 113. The distances $d_{ij}$ between the base stations are denoted by $d_{12}=d_{21}$, $d_{13}=d_{31}$, and $d_{23}=d_{32}$, assuming that the cells 101, 111, and 113 are indexed by 1, 2, and 3, respectively.

In some implementations, the dominance parameter $D_i$ may be calculated according to $$D_i = p_2 \sum_j r_{ij} + p_3 \cdot I_i - p_4 \sum_j d_{ij}. \quad (6)$$

In this case the dominant cell may be determined as the cell of the group having the largest dominance parameter $D_i$. The parameters $p_2$, $p_3$, $p_4$ may be used for defining weight factors which determine whether handover statistics, traffic load or geographical considerations are more important for determining the dominant cell. These parameters may be used for fine tuning of the process of determining the dominant cell.

As mentioned above, the performance-based cell aggregation may be used when expanding the mobile network by introducing a further frequency band, e.g., by starting with the first frequency band 100 and then introducing the second frequency band 200. A corresponding exemplary scenario will be further explained in connection with FIGS. 3 and 4.

Figure 3:
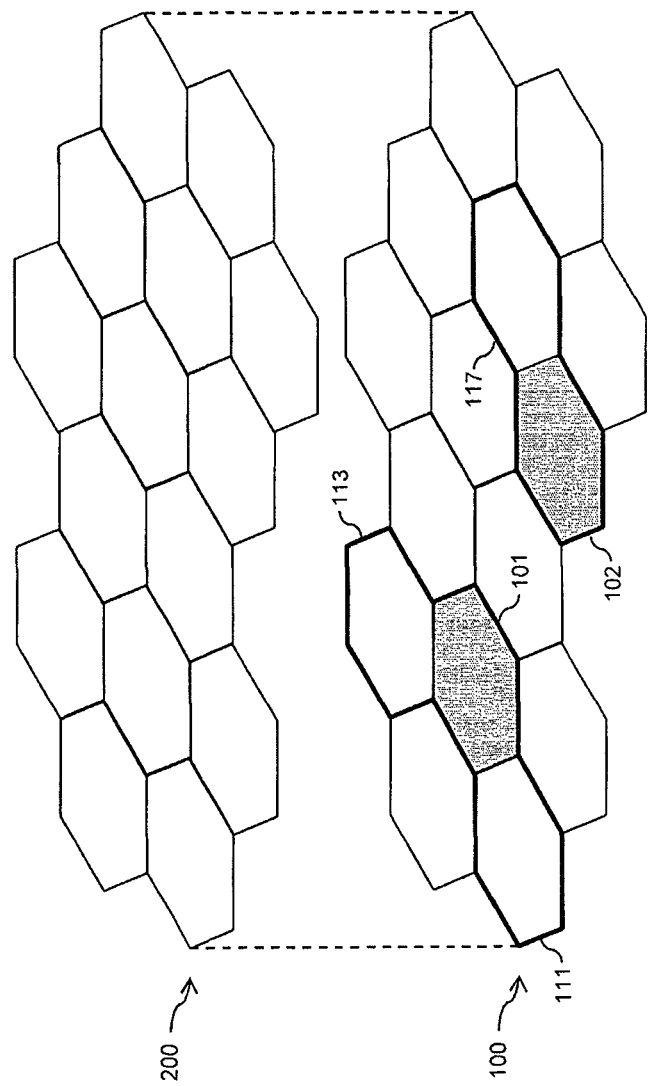
FIGS. 3 and 4 schematically illustrate an exemplary scenario in which cell aggregation according to an embodiment is applied when expanding a mobile network by a further carrier frequency band.

In FIG. 3, a situation is illustrated in which the second frequency band 200 is still unused. The second frequency band 200 has a cell structure which corresponds to that of the first frequency band 100. That is to say, for each cell in the first frequency band 100 there is a corresponding cell in the second frequency band 200. Typically, a cell in the first frequency band 100 and the corresponding cell in the second frequency 200 band share the same base station location. Further, a cell in the first frequency band 100 and the corresponding cell in the second frequency band 200 may have the same or similar geographical coverage.

In the situation of FIG. 3, aggregated cells are formed in the first frequency band 100. In the example of FIG. 3, a first aggregated cell is formed of cells 101, 111, and 113, and a second aggregated cell is formed of cells 102 and 117. The aggregated cells may be formed in accordance with the concepts as explained above, with the difference that in this case the combined capacity of the cell in the first frequency band 100 and the corresponding cell in the second frequency band 200 may be used. In this way, a cells in the first frequency band 100 can be aggregated even if its capacity in the first frequency band 100 alone would not be sufficient for aggregation. This lack of capacity can be compensated by the additional capacity provided by the corresponding cell in the second frequency band 200. In the illustrated example, the cell 101 is determined as the dominant cell of the first aggregated cell, and the cell 102 is determined as the dominant cell of the second aggregated cell.

Figure 4:
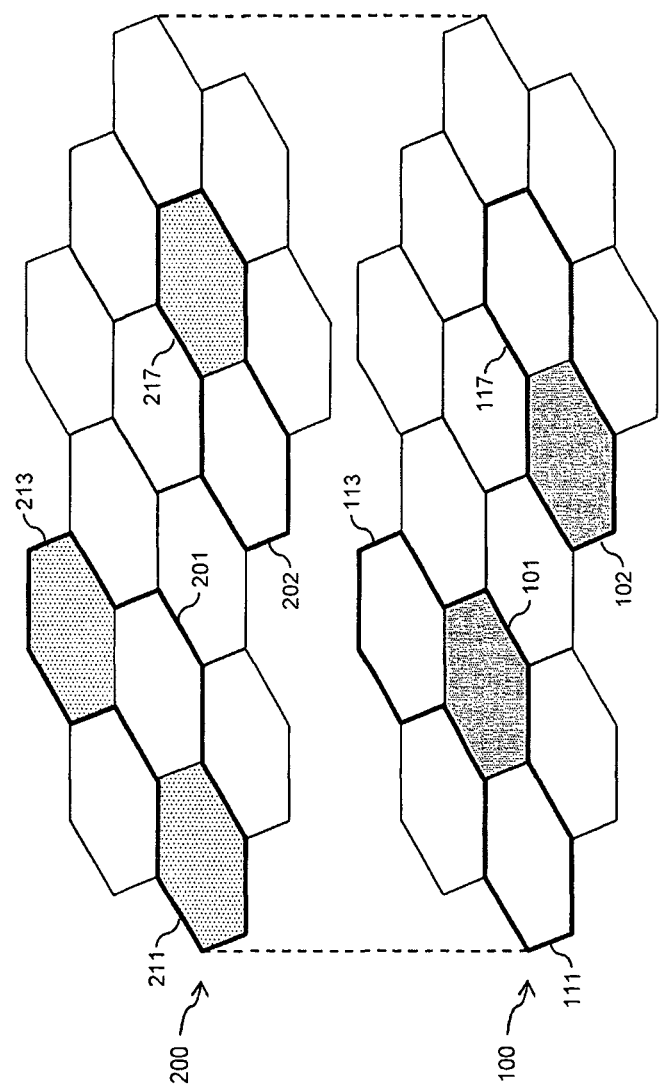

In the second frequency band 200, aggregated cells are formed to correspond those of the first frequency band. That is to say, if cells in the first frequency band 100 are aggregated, also the corresponding cells in the second frequency band 200 are aggregated, using neighbor relations between cells in the second frequency band 200 which are the same as the neighbor relations between the corresponding cells in the first frequency band 100 and also the same selection of dominant cell. In other words, if a cell is selected as dominant cell in the first frequency band 100, the corresponding cell is selected as dominant cell in the second frequency band 200. This is illustrated in FIG. 4. As can be seen from FIG. 4, a third aggregated cell is formed by cells 201, 211, and 213 of the second frequency band 200, which correspond to cells 101, 111 and 113, respectively. Further, a fourth aggregated cell is formed by cells 202 and 217 of the second frequency band 200, which correspond to cells 102 and 117, respectively. In the third aggregated cell, cell 201 is selected as dominant cell due to the selection of the corresponding cell 101 as dominant cell in the first frequency band 100. In the fourth aggregated cell, cell 202 is selected as dominant cell due to the selection of the corresponding cell 102 as dominant cell in the first frequency band 100.

Having determined the cell aggregation structure for the first frequency band 100 and the second frequency band 200, this cell aggregation structure can be configured into the network. At least at this point the cells of the second frequency band 200 should be activated in order to avoid overloading the aggregated cells in the first frequency band 100. For aggregated cells of the first frequency band 100, radio units or base stations of other cells than the dominant cell may not be needed in the first frequency band 100. These radio units or base stations may then be configured for transmission in the second frequency band 200. In the example of FIG. 4, radio units of the cells 111, 113, and 117 may be reused in this way for the corresponding cells 211, 213 and 217 of the second frequency band 200.

Figure 5:
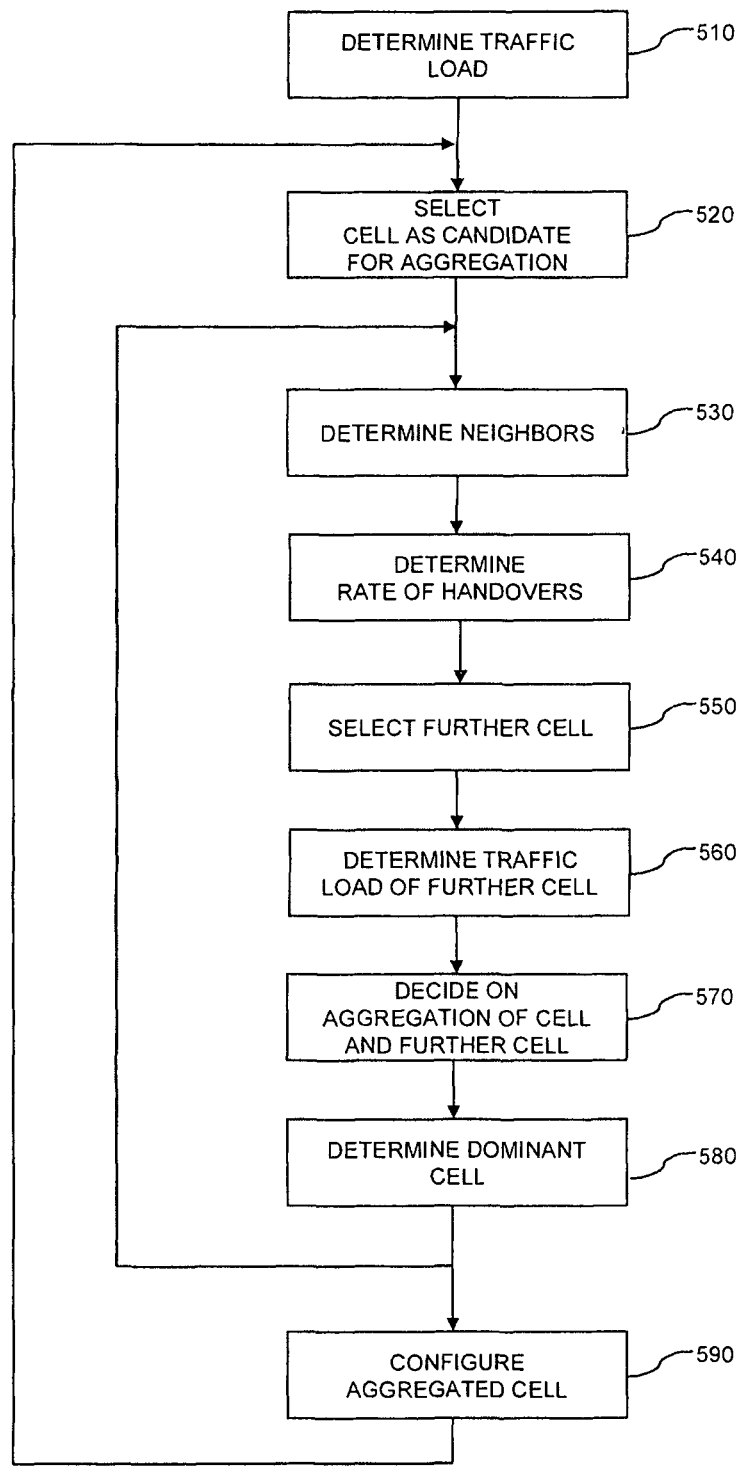
FIG. 5 shows a flowchart for illustrating a method according to an embodiment of the invention.

FIG. 5 shows a flowchart for illustrating a method for implementing the above concepts of cell aggregation. The method of FIG. 5 may be implemented by a network management device for controlling aggregation of cells of a mobile network, e.g., the network management device 300 of FIG. 1.

At step 510, the network management device determines a traffic load of a cell of the mobile network. The traffic load may for example be determined in terms of a peak hour load.

At step 520, the network management device may select the cell as a candidate for aggregation. This may be accomplished on the basis of the traffic load as determined at step 510, e.g., by comparing the traffic load to a threshold value. This threshold value may be defined in relation to a capacity of the cell, e.g., be in the range of 30% to 50% of the capacity of the cell. In this way, the device can efficiently check whether the cell has sufficient available capacity for aggregation with another cell.

At step 530, having selected the cell as candidate for aggregation, the network management device may determine neighboring cells of the cell, e.g., from a neighbor relation matrix of the cell.

At step 540, the network management device may determine a rate of handovers between the cell and at least one further. In particular, the rate of handovers may be determined for the neighboring cells as determined at step 530.

At step 550, the network management device may select the neighboring cell with the highest rate of handovers as a candidate to be aggregated with the cell. In this way, the effect of cell aggregation on handover reduction may be increased.

At step 560, the network management device may further determine a traffic load of the at least one further cell to be aggregated with the cell, e.g., of the candidate as selected at step 550.

At step 570, the network management device may decide on the aggregation of the cell and the further cell. This may be accomplished on the basis of the traffic load as determined at step 560. Other criteria may be taken into account as well, e.g., the rate of handovers between the cell and the further cell as determined at step 540. In some scenarios, the decision may be based on an estimated traffic load of the aggregated cell. In particular, the decision may be based on a comparison between the estimated traffic load of the cell and a threshold value. For example, the same threshold value as in step 520 may be used.

The traffic load of the aggregated cell may be estimated as the sum of the traffic load of the cell and the traffic load of at least one further cell minus an estimated traffic load due to handovers between the cell and the at least one further cell, e.g., as expressed in relation (2).

At step 580, the network management device may determine a dominant cell of the aggregated cell. For example, the dominant cell may be determined on the basis of distances between base stations of the cell and the at least one further cell, on the basis of the traffic load of the cell and the traffic load of the at least one further cell, and/or on the basis of the rate of handovers between the cell and the at least one further cell.

After step 580, the method may' return to step 530 to select a next further cell to be aggregated with the cell selected at step 520.

At step 590, the network management device may configure the aggregated cell into the cell structure of the mobile network. This may for example involve configuring neighbor relations of the aggregated cell with respect to other cells of the mobile network. The dominant cell may act as a representative of the aggregated cell. Further, a base station of the dominant cell may be configured as a donor base station and one or more base stations of the other cells of the aggregated cell may be configured as repeaters with a backhaul connection to the donor base station. In some scenarios, configuration parameters of the dominant cell may be reused for configuring the aggregated cell, i.e., the aggregated cell may inherit at least a part of the configuration of the dominant cell. In this way, configuration parameters of the aggregated cell may be determined in an efficient manner. In some scenarios, it is also possible to configure a base station of the dominant cell for transmission in a first frequency band and to configure one or more base stations of the other cells for transmission in a second frequency band, e.g., as explained in connection with the multi-carrier scenario of FIG. 4.

After step 590, the method may return to step 520 to form a further aggregated cell.

As can be seen, the method of FIG. 5 involves that the device determines a traffic load of a cell of the mobile network at step 510 and, at step 540, determines a rate of handovers between the cell and at least one further cell of the mobile network. On the basis of the traffic load and the rate of handovers, the device controls aggregation of the cell and the at least one further cell to an aggregated cell, which may involve the selections of steps 520 and 550 and the decision of step 570.

Figure 6:
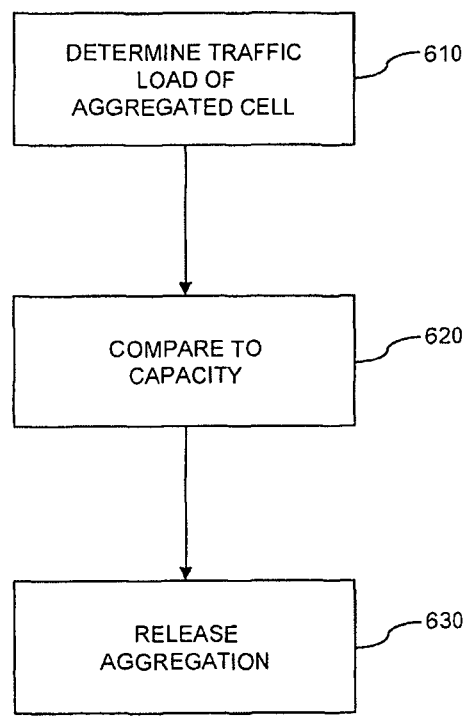
FIG. 6 shows a flowchart for illustrating a further method according to an embodiment of the invention.

FIG. 6 shows a flowchart for illustrating a further method for implementing the above concepts of cell aggregation. The method of FIG. 6 may be implemented by a network management device for controlling aggregation of cells of a mobile network, e.g., the network management device 300 of FIG. 1. The method of FIG. 6 may be performed with respect to an aggregated cell already configured into the mobile network, e.g., after aggregating one or more cells in accordance with the method of FIG. 5.

At step 610, the network management device measures the traffic load of the aggregated cell. Further, the network management device may obtain other quantities for assessing performance of the aggregated cell, e.g., a handover KPIs or other type of KPI.

At step 620, the network management device compares the traffic load to the capacity of the aggregated cell. The capacity of the aggregated cell may be estimated as being the same as the capacity of the dominant cell of the aggregated cell.

At step 630, the network management device may release the aggregation of the aggregated cell. This may be accomplished on the basis of the comparison of step 620. The release may also be based on further performance related quantities, e.g., KPIs as obtained at step 610.

Figure 7:
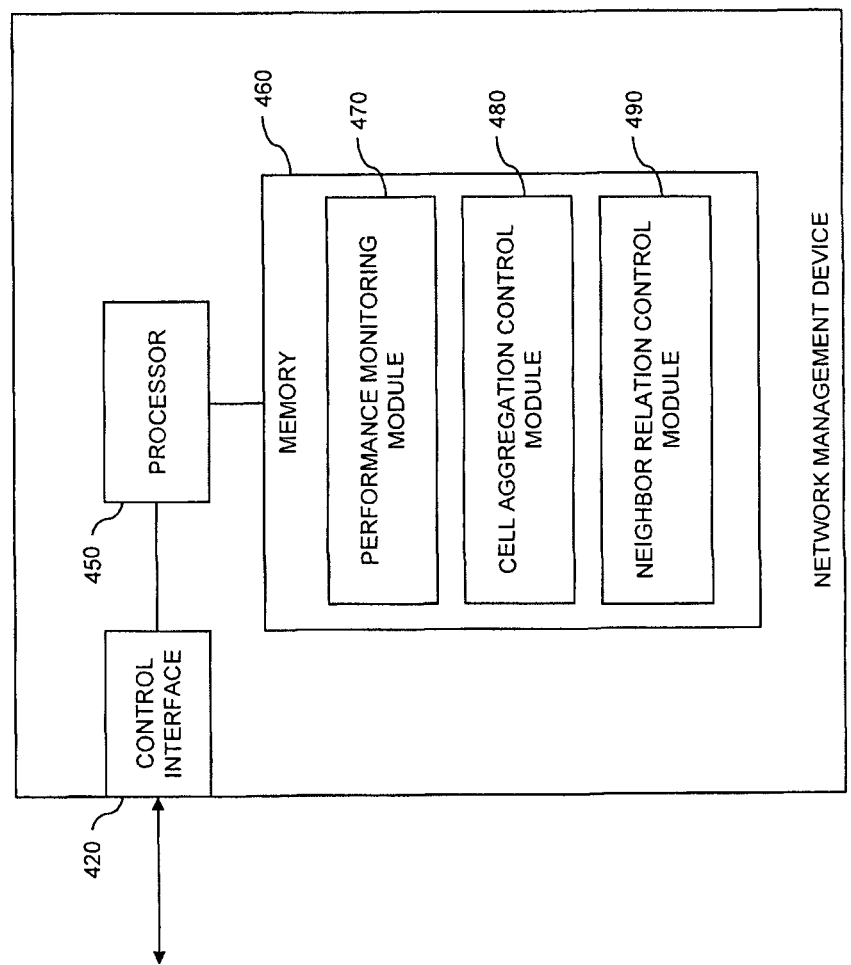
FIG. 7 schematically illustrates a network management device according to an embodiment of the invention.

FIG. 7 schematically illustrates exemplary structures for implementing the above-described concepts in a network management device. The network management device may for example implement the network management device 300 of FIG. 1.

In the illustrated structure, the network management device includes a control interface 420 for controlling cells of the mobile network. This control may be accomplished through one or more control node, such as the control nodes 150, 250, or directly with respect to base stations of the cells. The control interface 420 may further be used for obtaining performance data of the cells, e.g., for receiving measurement reports, KPIs, or the like.

Further, the network management device includes a processor 450 coupled to the control interface 420 and a memory 460 coupled to the processor 450. The memory 460 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 460 includes suitably configured program code to be executed by the processor 450 so as to implement the above-described functionalities for controlling cell aggregation. More specifically, the memory 460 may include a performance monitoring module 470 for accomplishing the above-described determination of performance data, in particular traffic loads, rates of handovers or KPIs. The performance monitoring module 470 may implement above-described functionalities of the performance monitor 310. Further, the memory 460 may include a cell aggregation control module 480 for performing operations for controlling the aggregation of cells, e.g., deciding on the aggregation of cells or deciding to release the aggregation of cells. The cell aggregation control module 480 may implement above-described functionalities of the cell aggregation controller 350. Further, the memory may include a neighbor relation control module 490 for performing optimization of neighbor relations between cells and aggregated cells. The neighbor relation control module may implement above-described functionalities of the neighbor relation controller 360.

It is to be understood that the structure as illustrated in FIG. 7 is merely schematic and that the network management device may actually include further components which, for the sake of clarity, have not been illustrated, e.g., further interfaces or additional processors. Also, it is to be understood that the memory 460 may include further types of program code modules, which have not been illustrated. For example, the memory 460 may include program code modules for implementing typical functionalities of a network management device, e.g., for optimization of neighbor relations between individual cells. According to some embodiments, also a computer program product may be provided for implementing concepts according to embodiments of the invention, e.g., a computer-readable medium storing the program code and/or other data to be stored in the memory 460.

As can be seen, concepts as described herein may be used for providing an efficient cell structure of a mobile network. For example, the number of handovers may be reduced by aggregating certain cells. Since handovers, may be complex and resource demanding procedures, this allows for saving network resources or improving capacity and complex procedure in mobile networks. This benefit can be obtained in both single-carrier mobile networks and multi-carrier mobile networks. Further, the concepts may be applied when expanding a mobile network by a further frequency band. In this case, reuse of radio units for the new frequency band becomes possible and immediate installation of certain radio units for the new frequency band can be avoided. Moreover, because the cell aggregation can be controlled in situ on the basis of measured traffic loads and handover rates, the resulting cell structure can be determined in a precise manner according to objective criteria. The performance of the resulting cell structure can be estimated in advance and improvements can be quantified. The dominant cell in an aggregated cell set can be automatically determined. Further, neighbor relations of the aggregated cells can be automatically optimized. Further, automatic fallback to a configuration of individual cells is possible if an aggregated cell faces performance problems. Still further, the concepts can be implemented in a centralized network management system and allow for reducing the need for manual work and tests.

It is to be understood that the concepts as explained above are merely exemplary and susceptible to various modifications. For example, the concepts may be applied in various types of communication mobile networks. Moreover, the concepts may be implemented by dedicated hardware and/or by software to be executed by a multipurpose processor of a network management device.

The invention claimed is:

1. A method for controlling aggregation of cells of a mobile network, the method comprising:
 a network management device determining a traffic load of a cell of the mobile network;
 the network management device determining a rate of handovers between the cell and at least one further cell of the mobile network;
 on the basis of the traffic load and the rate of handovers, the network management device controlling aggregation of the cell and the at least one further cell to an aggregated cell that is managed by the mobile network as a single cell with respect to providing radio coverage to user equipments operating in the mobile network; and
 for the aggregated cell, the network management device:
  determining a dominant cell of the aggregated cell;
  configuring a base station of the dominant cell as a donor base station; and
  configuring a base station or base stations of the other cell or cells in the aggregated cell as repeaters having backhaul connections to the donor base station.

2. The method according to claim 1, comprising:
the network management device comparing the traffic load of the cell to a threshold value; and
if the traffic load is below the threshold value, the network management device selecting the cell as a candidate for aggregation.

3. The method according to claim 2, wherein the threshold value is in the range of thirty percent to sixty percent of the capacity of the cell.

4. The method according to claim 1, comprising:
the network management device determining a rate of handovers between the cell and each of a plurality of neighboring cells of the cell; and
the network management device selecting the neighboring cell with the highest rate of handovers as a candidate to be aggregated with the cell.

5. The method according to claim 1, comprising:
the network management device determining a traffic load of the at least one further cell, wherein said controlling aggregation of the cell and the at least one further cell is further based on the traffic load of the at least one further cell.

6. The method according to claim 1, comprising:
the network management device estimating a traffic load of the aggregated cell; and
the network management device controlling the aggregation of the cell and the at least one further cell on the basis of the estimated traffic load of the aggregated cell.

7. The method according to claim 6,
wherein the traffic load of the aggregated cell is estimated as the sum of the traffic load of the cell and the traffic load of at least one further cell minus an estimated traffic load due to handovers between the cell and the at least one further cell.

8. The method according to claim 6, comprising:
the network management device comparing the estimated traffic load of the aggregated cell to a threshold value.

9. The method according to claim 1,
wherein the dominant cell is determined on the basis of distances between base stations of the cell and the at least one further cell forming the aggregated cell.

10. The method according to claim 1,
wherein the dominant cell is determined on the basis of the traffic load of the cell and traffic load of the at least one further cell forming the aggregated cell.

11. The method according to claim 1,
wherein the dominant cell is determined on the basis of the rate of handovers between the cell and the at least one further cell forming the aggregated cell.

12. The method according to claim 1, comprising:
reusing configuration parameters of the dominant cell for configuring the aggregated cell.

13. The method according to claim 1, comprising:
the network management device configuring a base station of the dominant cell for transmission in a first frequency band; and
the network management device configuring one or more base stations of the other cells for transmission in a second frequency band.

14. The method according to claim 1, comprising:
in response to aggregating the cell and the at least one further cell in a first frequency band, the network management device aggregating corresponding cells in a second frequency band.

15. The method according to claim 1, comprising:
the network management device monitoring a traffic load of the aggregated cell; and
on the basis of the traffic load, the network management device releasing aggregation of the cell and the at least one further cell.

16. A network management device for controlling aggregation of cells of a mobile network, the device comprising processing circuitry configured to:
determine a traffic load of a cell of the mobile network and to determine a rate of handovers between the cell and at least one further cell of the mobile network;
control, on the basis of the traffic load and the rate of handovers, aggregation of the cell and the at least one further cell to an aggregated cell that is managed by the mobile network as a single cell with respect to providing radio coverage to user equipments operating in the mobile network; and
for the aggregated cell:
determine a dominant cell of the aggregated cell;
configure a base station of the dominant cell as a donor base station; and
configure a base station or base stations of the other cell or cells in the aggregated cell as repeaters having backhaul connections to the donor base station.

17. A non-transitory computer-readable medium storing a computer program product comprising program code to be executed by a processor of a network management device, wherein said execution thereby configures the network management device to control aggregation of cells of a mobile network, said computer program product including program code to cause the network management device to:
determine a traffic load of a cell of the mobile network;
determine a rate of handovers between the cell and at least one further cell of the mobile network;
on the basis of the traffic load and the rate of handovers, control aggregation of the cell and the at least one further cell to an aggregated cell that is managed by the mobile network as a single cell with respect to providing radio coverage to user equipments operating in the mobile network; and
for the aggregated cell:
determine a dominant cell of the aggregated cell;
configure a base station of the dominant cell as a donor base station; and
configure a base station or base stations of the other cell or cells in the aggregated cell as repeaters having backhaul connections to the donor base station.

* * * * *